US012404161B2

(12) United States Patent
Krüger et al.

(10) Patent No.: US 12,404,161 B2
(45) Date of Patent: Sep. 2, 2025

(54) CARTRIDGE FOR INSERTING INTO A BEVERAGE-PREPARING MACHINE AND METHOD FOR OPERATING A CARTRIDGE OF THIS TYPE

(71) Applicant: Freezio AG, Amriswil (CH)

(72) Inventors: Marc Krüger, Bergisch Gladbach (DE); Günter Empl, Bergisch Gladbach (DE)

(73) Assignee: Freezio AG, Amriswil (CH)

( * ) Notice: Subject to any disclaimer, the term of this patent is extended or adjusted under 35 U.S.C. 154(b) by 131 days.

(21) Appl. No.: 18/280,498

(22) PCT Filed: Mar. 25, 2022

(86) PCT No.: PCT/EP2022/057909
§ 371 (c)(1),
(2) Date: Sep. 6, 2023

(87) PCT Pub. No.: WO2022/200564
PCT Pub. Date: Sep. 29, 2022

(65) Prior Publication Data

US 2024/0140775 A1 May 2, 2024

(30) Foreign Application Priority Data

Mar. 25, 2021 (DE) ..................... 10 2021 202 961.2

(51) Int. Cl.
*B67D 1/00* (2006.01)
*B67D 1/08* (2006.01)

(52) U.S. Cl.
CPC ......... *B67D 1/0079* (2013.01); *B67D 1/0021* (2013.01); *B67D 1/0051* (2013.01);
(Continued)

(58) Field of Classification Search
CPC .... B67D 2001/0092; B67D 2001/0094; B67D 2001/0098; B67D 2210/00031;
(Continued)

(56) References Cited

U.S. PATENT DOCUMENTS 19,824 A 4/1858 Bigelow
4,006,841 A * 2/1977 Alticosalian ........... B65D 83/20 222/145.5

(Continued)

FOREIGN PATENT DOCUMENTS

DE 102014108520 A1 12/2015
JP 2016-529943 A 9/2016

(Continued)

OTHER PUBLICATIONS

English Translation of International Preliminary Report on Patentability dated Sep. 12, 2023, for International Application PCT/EP2022/057909.

(Continued)

*Primary Examiner* — Charles P. Cheyney
(74) *Attorney, Agent, or Firm* — The Dobrusin Law Firm, P.C.

(57) ABSTRACT

The invention relates to a cartridge (1) for inserting into a beverage-preparing machine, comprising a cartridge body (3) and a cartridge cover (2) connected to the cartridge body (3), wherein: the cartridge body (3) has a plurality of chambers (4) filled with beverage substance; the cartridge cover (2) has a cartridge-emptying unit (20), a mixing chamber (14), and a fluid feed (15) leading into the mixing chamber (14); the cartridge-emptying unit (20) is provided for transferring beverage substance from one of the chambers (4) into the mixing chamber (14); and the mixing chamber (14) is provided for producing a beverage by mixing the beverage substance transferred from the one (Continued)

chamber (4) into the mixing chamber (14) with a liquid fed into the mixing chamber (14) by means of the fluid feed (15); the cartridge being characterized in that the cartridge body (3) and the cartridge cover (2) can be rotated relative to each other about a longitudinal axis (L) of the cartridge body (3). The invention also relates to a method for operating a cartridge (1).

19 Claims, 2 Drawing Sheets

(52) U.S. Cl.
CPC ................ *B67D 2001/0091* (2013.01); *B67D 2001/0821* (2013.01)

(58) Field of Classification Search
CPC ........... B67D 2210/00049; B67D 2210/00062; B67D 1/008; B67D 1/0078; B67D 1/0079; B67D 1/0021; B67D 1/0888; B67D 1/0431; B67D 1/04; A47J 31/407; A47J 31/0673; A47J 31/3695
USPC .................. 222/129.1, 400.7, 144.5, 105, 94
See application file for complete search history.

(56) References Cited

U.S. PATENT DOCUMENTS 4,838,457 A * 6/1989 Swahl .................. B65D 47/265 222/548
7,445,372 B1 * 11/2008 Engel .................... B01F 27/271 366/195
8,596,498 B2 * 12/2013 Werner ............... B05B 11/1083 222/145.5
8,834,014 B2 * 9/2014 Summons ............. B01F 35/425 211/74
8,916,106 B2 * 12/2014 Gaj ..................... A47L 15/4445 422/271
11,109,708 B2 * 9/2021 Lecomte .............. B67D 1/0085
11,292,707 B2 * 4/2022 Lecomte .............. B67D 1/0431
11,627,838 B1 * 4/2023 Litman ................. B01F 35/883 222/145.5
11,969,072 B2 * 4/2024 Hedaoo .................. A45D 40/24
2005/0151764 A1 * 7/2005 Grady .................. B41J 2/17566 347/7
2009/0308488 A1 * 12/2009 Bennett .............. B65D 51/2814 222/129
2011/0181417 A1 * 7/2011 Haskayne ............ B67D 1/0021 340/572.1
2012/0248055 A1 * 10/2012 Kountotsis ........... B65D 47/265 220/253
2015/0374025 A1 * 12/2015 Evans ...................... A23N 1/02 99/495
2018/0072553 A1 3/2018 Lyons
2019/0284036 A1 9/2019 Krüger et al.

FOREIGN PATENT DOCUMENTS

JP 2022-546296 A 11/2022
WO 2017/121802 A1 7/2017

OTHER PUBLICATIONS

International Search Report and Written Opinion dated Jul. 28, 2022, for International Application PCT/EP2022/057909.
Japanese Office Action dated Aug. 19, 2024, for Japanese Application No. 2022-546296.
Chinese Office Action, dated Jun. 20, 2025, for Chinese Application No. 202280024435.2.

* cited by examiner

CARTRIDGE FOR INSERTING INTO A BEVERAGE-PREPARING MACHINE AND METHOD FOR OPERATING A CARTRIDGE OF THIS TYPE

PRIOR ART

The invention relates to a cartridge for inserting into a beverage-preparing machine, and to a method for operating a cartridge for inserting into a beverage-preparing machine.

Cartridges for inserting into a beverage-preparing machine are known from the prior art. For example, publication WO 2017/121 802 A1 discloses the production of beverages using cartridges which are already portion-sized with a beverage substance. Producing beverages using such systems is extremely convenient for the user because he/she has only to insert a cartridge into the beverage-preparing machine and initiate a start-up procedure. The beverage-preparing machine, also referred to as a dispenser, thereafter fully automatically handles the preparation of the beverage, i.e. in particular that the beverage substance is mixed with a predetermined quantity of liquid, in particular cold and carbonized water, and is directed into a drinking vessel. In this way, beverages can be produced in a significantly simpler and more rapid manner and with less complexity for the user. The user can choose from a multiplicity of different cartridges so that he/she can produce different beverages at will.

For inserting into the beverage-preparing machine and for producing a beverage, the cartridge has a cartridge body which is connected to a cartridge lid. The beverage substance for producing the beverage is disposed in the cartridge body, and the cartridge lid serves as an interface for coupling to the beverage-preparing machine, which enables the beverage substance to be brought into contact with water, for example, to be mixed with the latter, or to be dissolved in the latter.

In the preparation of beverages it is not unusual that a plurality of beverages are to be provided in rapid succession. These may be a plurality of identical or different ready-to-drink beverages, for example for hosting a group of people. However, a ready-to-drink beverage may frequently also be a mixed drink for the preparation of which a plurality of beverages are prepared in succession and added to one another so as to form the mixed drink. It has been demonstrated that changing the cartridge prolongs the preparation of a plurality of beverages and an unsatisfactory preparation experience is created for the user as a result.

DISCLOSURE OF THE INVENTION

It was, therefore, the object of the present invention to make available a cartridge for inserting into a beverage-preparing machine, which meets the requirements set for a rapid succession of beverage preparations without comparatively long intervals between the beverage preparations. The intention is in particular to enable dispensing of a plurality of beverages in succession or adding of a plurality of beverages so as to form a mixed drink without changing the cartridge.

This object is achieved by a cartridge as claimed in claim 1, and by a method as claimed in claim 13.

The explanations pertaining to this subject matter of the present invention also apply in an analogous manner to the other subject matter of the present invention and vice versa.

The present invention relates to a cartridge for inserting into a beverage-preparing machine, in particular for inserting into a dispenser. A cartridge of this type usually has a cartridge body having a chamber in which a beverage substance for preparing a beverage is disposed. Moreover, the cartridge has a cartridge lid. The cartridge lid serves as an interface to the beverage-producing machine and provides a mixing chamber into which the beverage substance is transferred from the chamber by means of a cartridge emptying unit. For preparing the beverage, the beverage substance transferred into the mixing chamber is mixed with a liquid which is fed from the beverage-preparing machine to the mixing chamber by a fluid infeed.

The cartridge lid has a connecting region for connecting to the cartridge body, wherein the cartridge lid conjointly with the cartridge body is able to be inserted into a beverage-preparing machine. The cartridge lid is preferably configured in the shape of a cap and on that side that points to the cartridge body has a large free opening. Prior to use, the cartridge lid is preferably connected to the cartridge body, in particular by a cartridge neck. This connection particularly preferably is performed reversibly or irreversibly, for example by way of a snap-fit fastener and/or a twist fastener.

The cartridge body is preferably snap-fitted to the cartridge lid. The cartridge body and the cartridge lid preferably have mutually engaging holding elements. It is conceivable that the cartridge lid has a groove and the cartridge body has a flange that engages in the groove. However, it is also conceivable that the cartridge lid has the flange and the cartridge body has the groove. It is furthermore conceivable that the cartridge lid has a latching cam which is disposed along the longitudinal axis, engages in a receptacle of the cartridge body and latches therein. It is conceivable that the cartridge lid and the cartridge body are mounted on the groove and the flange, and/or on the latching cam and the receptacle, so as to be rotatable relative to one another.

The cartridge lid is preferably provided to be placed onto a cartridge bracket of the beverage-preparing machine, said cartridge bracket being configured in particular in the manner of a balcony. In the manner of a balcony preferably means that the cartridge bracket protrudes laterally from a housing of the beverage-preparing machine and has a substantially horizontal extent. In order for the cartridge to be able to be inserted into the cartridge bracket, the cartridge bracket preferably has a recess which is in particular centered. The cartridge is then particularly preferably able to be inserted into this recess from above, the cartridge lid leading. The cartridge, in particular the cartridge lid, is most particularly preferably reversibly lockable in the cartridge bracket.

The cartridge lid has a mixing chamber which is able to be fluidically connected to the chambers, and a fluid infeed which for directing liquid into the mixing chamber opens into the mixing chamber. This mixing chamber is preferably a free volume in the cartridge lid and particularly preferably is seamlessly contiguous to the cartridge body. The fluid infeed is preferably a fluid infeed opening, in particular in a lateral wall of the cartridge lid, so that the liquid is particularly preferably introduced into the mixing chamber substantially at a right angle in relation to the longitudinal axis.

The cartridge lid has a cartridge unloading installation for at least partially transferring the beverage substance from one or a plurality of chambers into the mixing chamber. Furthermore, the cartridge lid preferably has a beverage outlet for discharging a beverage from the mixing chamber, in particular directly, into a beverage container. The cartridge unloading installation is preferably activatable in a targeted manner so that no inadvertent transfer of the beverage substance into the mixing chamber takes place. The cartridge lid is particularly preferably provided in such a manner that said cartridge lid is able to be assembled on the cartridge body and subsequently, with the cartridge lid pointing downward, is disposed in the beverage-preparing machine in such a manner that the mixed beverage is transferred, in particular by gravity, from the cartridge lid into the beverage container.

It is provided according to the invention that the cartridge body and the cartridge lid are configured so as to be rotatable relative to one another about the longitudinal axis of the cartridge body. Twisting the cartridge body and the cartridge lid relative to one another causes the assembly of the chambers of the cartridge body to be rotated relative to the cartridge emptying unit of the cartridge lid. As a result, the cartridge according to the invention enables the beverage substance to be fed to the mixing chamber from different chambers, depending on the rotary position. If different beverage substances are disposed in each of the chambers, a mixed drink can thus be prepared, for example, by mixing the beverage substance from a first chamber with the liquid, subsequently rotating, and mixing the beverage substance from a second chamber with the liquid, without having to change the cartridge. If identical beverage substances are disposed in the chambers, identical beverages can thus be prepared in rapid succession by mixing the beverage substance from the first chamber with the liquid, subsequently rotating, and mixing the beverage substance from the second chamber with the liquid. In this way, the cartridge lid, conjointly with its mixing chamber, the fluid infeed and the cartridge emptying unit, is used multiple times. Apart from the ease of operation and the significant increase in the preparation rate of a plurality of beverages or a mixed drink, respectively, significantly less waste is created.

The cartridge lid is preferably made entirely or partially from a plastics material, in particular by an injection-molding and/or a blow-molding method. According to one preferred embodiment it is provided that the beverage outlet is configured so as to be substantially duct-shaped, in particular elongate, and/or that the fluid infeed is a fluid infeed opening which is configured to establish a fluidic connection to a fluid line of the beverage-preparing machine. The beverage outlet particularly preferably extends substantially along the longitudinal axis of the cartridge when the cartridge body and the cartridge lid are connected.

According to one preferred embodiment it is provided that the cartridge emptying unit is configured in such a manner that the latter transfers the beverage substance from exactly one chamber into the mixing chamber, wherein this chamber is selectable by a relative rotating movement of the cartridge body in relation to the cartridge lid. This results in the advantageous technical effect that the beverage substance is at all times fed from only one chamber to the mixing chamber. Any unintentional excessive metering of the beverage substance is avoided as a result. The rotation for selecting the chamber from which the beverage substance is fed to the mixing chamber enables an ergonomic and comfortable operation which corresponds to a natural sequence when selecting available alternatives, for example by means of a twist-and-push selector switch. The rotation on the cartridge body here makes possible a construction which is of minor technical complexity, this enabling a robust and inexpensive cartridge which offers maximum comfort.

According to a further preferred embodiment it is provided that the cartridge body has an in particular barrel-shaped external wall, and the plurality of chambers are mutually separated by internal walls running in a star-shaped manner from the longitudinal axis of the cartridge body radially outward to the external wall. This advantageously makes possible that the available volume is optimally utilized for the chambers for the disposal of the beverage substance. In the case of an eccentrically disposed cartridge emptying unit, the star-shaped arrangement of the internal walls permits easy changing of the chamber selected for transferring the beverage substance by way of the rotation about the longitudinal axis. It is conceivable that the external wall is made entirely or partially from a plastics material. It is furthermore conceivable that the internal walls are made from a plastics material. It is conceivable that the internal walls and/or the external wall are/is produced by an injection-molding and/or a blow-molding method. However, it is also conceivable that the external wall and/or the internal walls are/is produced entirely or at least partially from a metal, preferably from aluminum. It is also imaginable that the external wall and/or the internal walls are/is produced entirely or at least partially from coated paper or paperboard.

According to a further preferred embodiment it is provided that a base side of the cartridge body that faces the cartridge lid is closed by a sealing element, wherein the sealing element preferably is a sealing film/foil which is particularly preferably fastened in a materially integral manner to a peripheral region or a flange of the cartridge body. In this way it is ensured in an advantageous manner that the beverage substance is held in the chambers until said beverage substance is fed to the mixing chamber for the preparation of the beverage. The sealing element preferably hermetically seals the cartridge body. It is preferably provided that the sealing element is sealed to the peripheral region or the flange of the cartridge body, or is welded or adhesively bonded to the peripheral region or the flange of the cartridge body. It is conceivable that the sealing film/foil is a plastic film or a metal foil, for example an aluminum foil.

According to a further preferred embodiment it is provided that the sealing element extends across a plurality of chambers, and in particular completely across the base side of the cartridge body, and is connected in a materially integral manner to peripheral regions of the internal walls. This has the effect of an advantageously improved stability of the sealing element and of a reliable mutual separation of the chambers. The separation of the chambers ensures that the beverage substances of the chambers do not mix with one another, and that a beverage substance does not make its way from a chamber filled with the beverage substance into an already emptied chamber, this precluding any leakage of a partially emptied cartridge body. It is preferably provided that the sealing element is sealed to the peripheral regions of the internal walls, or is welded or adhesively bonded to the peripheral regions of the internal walls.

According to a further preferred embodiment it is provided that the cartridge emptying unit has an opening means for opening the sealing element in the region of a chamber. It is as a result in an advantageous manner that the sealing means in the region of a selected chamber for transferring the beverage substance into the mixing chamber is opened and it is thus ensured that no beverage substance is transferred into the mixing chamber from a chamber that has not been selected. Any inadvertent mixing of beverage substances from different chambers in the mixing chamber can thus be avoided. The chambers in the region in which the sealing means has not been opened remain closed so that no beverage substance can leak from said chambers. The cartridge unloading installation is preferably activatable in a targeted manner so that no unintentional transfer of the beverage substance into the mixing chamber takes place.

According to a further preferred embodiment it is provided that the opening means comprises a perforation needle which is displaceable between a retracted position in which said perforation needle is spaced apart from the sealing element, and a deployed position in which said perforation needle pierces the sealing element. This makes possible that the sealing element is opened in a targeted manner and in a small area. An individual chamber can be opened in a highly targeted manner by opening the sealing element by piercing the latter with the perforation needle. It is ensured in the retracted position that no chamber is unintentionally opened. In the deployed position, the perforation needle can serve for keeping open the pierced opening in the sealing element and for feeding the beverage substance into the mixing chamber. It is conceivable that the perforation needle is produced at least partially from a metal. It is however also conceivable that the perforation needle is produced at least partially from a plastics material.

It is preferably provided that the cartridge lid comprises a mandrel guide in which the perforation needle is mounted so as to be displaceable, in particular in a direction toward the chamber. It is preferably furthermore provided that the perforation needle is provided to be transferred from the retracted position to the deployed position by an actuator element of the beverage-preparing machine.

According to a further preferred embodiment it is provided that the perforation needle has a compressed air duct for directing compressed air into the respective chamber in the deployed position. As a result, it is advantageously possible that the beverage substance is forced out of the chamber by directing compressed air into the chamber for the transfer into the mixing chamber. During the preparation, the compressed air is preferably fed substantially simultaneously with the liquid so that the liquid and the beverage substance make their way into the mixing chamber at the same time and mix in the latter. The person skilled in the art understands that, depending on the design embodiment, there may also be a minor temporal offset so as to achieve complete mixing in the mixing chamber. The compressed air, in particular conjointly with gravity, forces the beverage substance out of the chamber and prevents a vacuum being created in the chamber, which could prevent complete emptying of the chamber. To this end, it is preferably provided that the cartridge unloading installation comprises a compressed air connector and a compressed air line which extends from the compressed air connector to the compressed air duct, wherein the compressed air duct in the deployed position of the perforation needle opens into the chamber. It is preferably provided that the compressed air connector is provided for connecting to a compressed air supply of the beverage-preparing machine.

According to a further preferred embodiment it is provided that the perforation needle has a transfer duct for transferring the beverage substance from the respective chamber into the mixing chamber in the deployed position. An outflow of the beverage substance from the chamber is enabled in a particularly simple and reliable manner as a result. The perforation needle preferably has a plurality of transfer ducts for transferring the beverage substance from the respective chamber into the mixing chamber in the deployed position. Alternatively or additionally, the perforation needle on the external circumference thereof has at least one, preferably a plurality of, concavities and/or convexities which is/are provided as an outlet for the beverage substance. The amount and the size of the concavities and/or convexities are preferably a function of the viscosity of the substrate.

According to a further preferred embodiment it is provided that the compressed air duct and/or the transfer duct are/is configured as a unilaterally open groove on an external face of the perforation needle, or as a tubular line within the perforation needle. A unilaterally open groove on the external face is a particularly inexpensive way to produce and provide a transfer duct or a compressed air duct. It is particularly preferably provided that the compressed air duct is configured as a tubular line within the perforation needle, and that the transfer duct is configured as a unilaterally open groove on the external face of the perforation needle. Sufficient spatial separation between compressed air exiting the compressed air duct and the beverage substance entering the transfer duct is implemented in an advantageous manner as a result. It is implemented in particular that the compressed air is guided into the chamber in a precisely targeted manner, while the typically at least slightly viscous beverage substance is transferred into the mixing chamber with a reduced risk of adhering to the duct walls of a tubular duct, and thus more easily.

The external wall of the perforation needle is thus preferably provided with at least one side duct as the transfer duct for directing the beverage substance in the direction of the mixing chamber. In particular, the beverage substance can flow in the direction of the mixing chamber so as to bypass the sealing element by way of the transfer duct configured laterally on the perforation needle. A plurality of side ducts are preferably configured as transfer ducts on the perforation needle. The transfer ducts are in particular all configured in each case in the form of a unilaterally open groove. It is conceivable that the cross section of the transfer ducts and/or the number of transfer ducts are/is adapted to the viscosity of the beverage substance so that the transfer ducts control or limit the flow of the beverage substance in the direction of the mixing chamber. In the case of a high viscosity, a plurality of transfer ducts or transfer ducts with a larger cross section are used, while fewer transfer ducts or transfer ducts with a smaller cross section are provided in the case of a lower viscosity. The person skilled in the art understands that this means in particular that a matching cartridge lid is provided for each beverage substance and thus for different types of cartridge bodies. The perforation needle is the only movable element of the cartridge lid, and the cartridge lid is thus of a robust construction and easy to produce. A fluidic connection between the compressed air connector and the compressed air duct preferably exists only in the deployed position. In particular, compressed air cannot exit the compressed air duct in the retracted position. As a result, it is particularly advantageously ensured that compressed air makes its way from the compressed air duct only in the deployed position, i.e. when the sealing element has been pierced.

According to a further preferred embodiment it is provided that a ratchet mechanism that defines latching positions in which the opening means is in each case disposed centrally below a chamber is configured between the cartridge body and the cartridge lid. As a result, it is advantageously ensured that the relative position of the cartridge body in relation to the cartridge lid after a rotation of the cartridge body relative to the cartridge lid is such that the beverage substance is transferred from exactly one chamber into the mixing chamber when preparing a beverage. As a result of the position which is situated centrally below the chamber and in which the opening means is in a latching position it is furthermore ensured that an optimal and almost complete feeding of the beverage substance to the mixing chamber, in particular an optimal and complete evacuation of the beverage substance by the compressed air, takes place. It is conceivable that the ratchet mechanism permits rotation about the longitudinal axis of the cartridge body relative to the cartridge lid only in one rotation direction. It is thus advantageously ensured that, after a first beverage preparation with the beverage substance from a first chamber and a second beverage preparation from a second chamber for a subsequent beverage preparation, the first chamber, which has been emptied as a result of the first beverage preparation, is not inadvertently positioned again above the opening means. It is conceivable that the ratchet mechanism has a catch that engages in a toothed latching rail. It is conceivable that the catch engages in an engagement position between the teeth of the latching rail, and that the engagement position defines the latching position. It is conceivable that the catch is preloaded so as to engage in the engagement position. It is conceivable, for example, that the catch and preferably the latching rail are made from a plastics material. It is conceivable that the teeth of the latching rail on a first side have a slight gradient and on a second side have a steep gradient. As a result, it is advantageously implemented that dissimilarly high forces are applied for rotating in different directions, as a result of which a reverse rotation to an already emptied chamber is prevented or at least impeded.

According to a further preferred embodiment it is provided that a blocking mechanism, which is adjustable between a blocking position in which the relative rotating movement of the cartridge body in relation to the cartridge lid is blocked, and a releasing position in which the relative rotating movement of the cartridge body in relation to the cartridge lid is released, is configured between the cartridge body and the cartridge lid. Any unintentional rotation of the cartridge body relative to the cartridge lid is advantageously prevented as a result. It is conceivable that the cartridge body, for transferring the cartridge from the blocking position to the releasing position, is moved along the longitudinal axis relative to the cartridge lid, preferably that the cartridge body and the cartridge lid are pulled apart or compressed somewhat. However, it is also conceivable that the cartridge body or the cartridge lid for transferring the cartridge from the blocking position to the releasing position is laterally impressed. It is conceivable that the blocking mechanism has a first blocking element, disposed on the cartridge body, and a second blocking element, disposed on the cartridge lid. It is conceivable that the first blocking element and the second blocking element in the blocking position are connected to one another in a form-fitting and/or force-fitting manner, and that the blocking elements in the releasing position are mutually spaced apart such that there is no form-fit and no force-fit between the blocking elements.

A further subject matter of the present invention is a method for operating a cartridge according to the invention, comprising the following method steps:

a. rotating the cartridge body relative to the cartridge lid until the cartridge emptying unit is co-aligned with a desired chamber in a first method step;
b. opening the chamber by means of the cartridge emptying unit in a second method step;
c. transferring the substance disposed in the chamber into the mixing chamber by means of the cartridge emptying unit in a third method step; and
d. feeding a liquid into the mixing chamber by means of the fluid infeed in the third method step.

The method according to the invention advantageously makes it possible for a chamber of the cartridge to be selected for the beverage preparation by rotating the cartridge body relative to the cartridge lid. Changing a cartridge for selecting a chamber is not required, as a result of which the time required for preparing a beverage is significantly reduced when a cartridge has already been inserted. In particular in a sequence of beverage preparations, the method according to the invention is very convenient, more convenient than comparable methods from the prior art in which no chamber of a plurality of chambers is selected by rotation.

The explanations associated with this subject matter of the present invention also apply in an analogous manner to the other subject matter of the present invention and vice versa.

According to a preferred embodiment it is provided that, in a fourth method step, the cartridge body is again rotated relative to the cartridge lid until the cartridge emptying unit is co-aligned with a further chamber, and repeating the second and the third method step with the further chamber. The rotating movement in the fourth step, after the beverage preparation in the third step, permits a further beverage preparation in the fourth step without having to change the cartridge or the cartridge body in the process. This advantageously enables a rapid succession of beverage preparations, for example when hosting guests. If the chambers of the cartridge are filled with different beverage substances, a mixed drink can thus be prepared in a simple, rapid and convenient manner in this way, by adding the beverage of the beverage preparation from the fourth step to the beverage of the beverage preparation from the third step.

According to a preferred embodiment it is provided that, in the second method step, a sealing element closing the chamber is perforated in that a perforation needle is displaced from a retracted position into a deployed position. It is advantageously ensured as a result that the beverage substance exits the chamber only for the beverage preparation. The perforation of the sealing element by the perforation needle furthermore ensures that only that chamber envisaged for the beverage preparation is emptied. Any unintentional mixing of beverage substances is thus precluded. It is conceivable that the perforation needle is transferred from the retracted position to the deployed position by an actuator element of the beverage-preparing machine. To this end, it is conceivable that the actuator element has at least one protrusion which engages in a form-fitting and/or force-fitting manner in a lower end of the perforation needle and, when the actuator element is activated, displaces said perforation needle within a mandrel guide in the direction of the chamber in such a manner that the perforation needle pierces the sealing element.

According to a preferred embodiment it is provided that, in the third method step, compressed air is directed through a compressed air duct of the perforation needle into the chamber, and the beverage substance is directed through a transfer duct of the perforation needle from the chamber into the mixing chamber.

As a result, it is advantageously possible that the beverage substance is forced out of the chamber by directing compressed air into the chamber for the transfer into the mixing chamber. During the preparation, the compressed air is preferably fed substantially simultaneously with the liquid so that the liquid and the beverage substance make their way into the mixing chamber at the same time and mix in the latter. The person skilled in the art understands that, depending on the design embodiment, there may also be a minor temporal offset so as to achieve complete mixing in the mixing chamber. The compressed air, in particular conjointly with gravity, forces the beverage substance out of the chamber and prevents a vacuum being created in the chamber, which could prevent complete emptying of the chamber. To this end, it is preferably provided that the cartridge unloading installation comprises a compressed air connector and a compressed air line which extends from the compressed air connector to the compressed air duct, wherein the compressed air duct in the deployed position of the perforation needle opens into the chamber. It is preferably provided that the compressed air connector is provided for connecting to a compressed air supply of the beverage-preparing machine.

According to a preferred embodiment it is provided that in an intermediate step, which is carried out after the third method step and before the fourth method step, the perforation needle is displaced from the deployed position into the retracted position. The rotating in the fourth step is advantageously facilitated as a result. The perforation needle in the retracted position is not in contact with the cartridge body so that the rotation of the cartridge body and the cartridge lid relative to one another is not impeded by the perforation needle. It is conceivable that the displacement of the perforation needle from the deployed position into the retracted position is caused by the actuator element of the beverage-preparing machine.

DESCRIPTION OF THE FIGURES

The invention will be explained hereunder by means of FIGS. 1 and 2. These explanations are merely exemplary and do not limit the general concept of the invention. The explanations apply to the cartridge according to the invention and likewise to the method according to the invention. Identical elements are in particular provided with the same reference signs.

Figure 1:
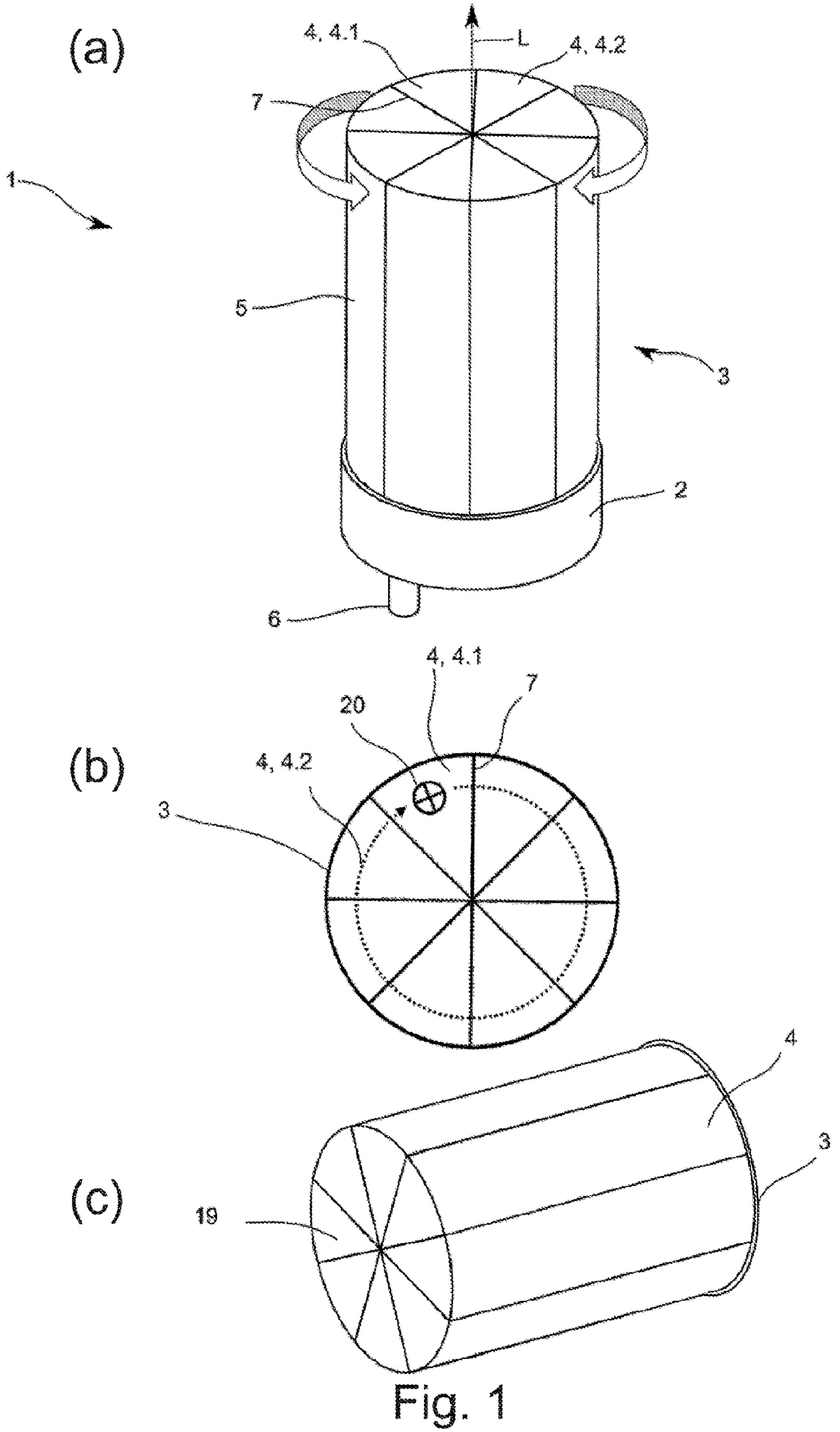
FIG. 1 (*a*)-(*c*) shows a cartridge according to an exemplary embodiment of the present invention, and an individual cartridge body of a cartridge according to an exemplary embodiment of the present invention, as seen from different angles.

Illustrated in a perspective view in FIG. 1 (*a*) is a cartridge 1 according to a first exemplary embodiment of the present invention. The cartridge 1 has a cartridge body 3 having a plurality of chambers 4, and a cartridge lid 2. A beverage substance for preparing a beverage in a beverage-preparing machine (not illustrated) is disposed in each of the chambers 4. The same beverage substance may be disposed in each of the chambers 4. However, it is also conceivable that a first beverage substance is disposed in a chamber 4.1, and a second beverage substance is disposed in a further chamber 4.2.

The cartridge 1, and in particular the external wall 5 of the cartridge body 3, can have a substantially arbitrary shape, for example a round or angular cross section, and dimensions, in particular of length and diameter, which are in a wide potential range. The only condition is that the cartridge body 3 has to be configured in such a manner that the cartridge lid 2 of the cartridge 1 is connectable thereto.

The chambers 4 are formed by internal walls 7 which are preferably made from a plastics material and which, proceeding from a center of the cartridge body 3 that is disposed on a longitudinal axis L of the cartridge body 3, are disposed so as to run in a star-shaped manner to an external wall 5 of the cartridge body 3. The internal walls 7 thus divide the cartridge body 3 into chambers 4 like pie slices. Illustrated is a cartridge body 3 having eight chambers 4 of identical size. However, any other number greater than one is also conceivable. It is furthermore conceivable that the chambers 4 are of dissimilar sizes.

The external wall 7 of the cartridge body 3 is preferably cylindrical and made at least partially from a plastics material and/or a metal.

The cartridge body 3 is disposed on a cartridge lid 2. The cartridge lid 2 has a beverage outlet 6 and serves as an interface to the beverage-preparing machine.

The cartridge lid 2 and the cartridge body 3 are rotatable relative to one another about the longitudinal axis L (illustrated by arrows).

The cartridge body 3 is plotted in a view from above in FIG. 1 (*b*). In order to highlight the technical effect of a rotation about the longitudinal axis (here orthogonal to the paper plane), a cartridge emptying unit 20 of the cartridge lid is plotted here, which in a view from above would actually be obscured by the cartridge body 3. The cartridge emptying unit 20 serves for retrieving the beverage substance from a chamber 4 so as to prepare a beverage with the beverage substance.

The cartridge emptying unit 20 is disposed centrally below a chamber 4, 4.1. In this position, the beverage substance by way of the cartridge emptying unit 20 can be retrieved from the chamber 4, 4.1 and fed to a beverage preparation. When the cartridge body 3 and the cartridge lid now are rotated relative to one another about the longitudinal axis L (illustrated by the dashed arrow), the position of the cartridge emptying unit 20 relative to the cartridge body 3 also changes.

The cartridge 1 between the cartridge body 3 and the cartridge lid 2 has a latching mechanism (not illustrated for reasons of clarity) which defines latching positions in which the cartridge emptying unit 20 is disposed centrally below a chamber 4. In the position illustrated, a beverage can be prepared using the beverage substance from the chamber 4, 4.1. If a further beverage is to be prepared, the cartridge body 3 does not have to be retrieved. By a rotation about the longitudinal axis L the cartridge body 3 is disposed such that the latching mechanism latches in a latching position and the cartridge emptying unit 20 is disposed centrally below a further chamber 4.2.

In order to prevent any unintentional rotation of the cartridge body 3 relative to the cartridge lid 2, the cartridge 1 has a blocking mechanism (not illustrated). The blocking mechanism can be transferred from a blocking position in which rotation is suppressed, to a releasing position in which rotation is released, and back. To this end it is conceivable that, for transferring the blocking mechanism from the blocking position to the releasing position, the cartridge body 3 is pressed onto the cartridge lid 2, or the cartridge body 3 is pulled away from the cartridge lid 2, or the cartridge body 3 is laterally impressed.

The cartridge body 3 in FIG. 1 (*c*) is plotted in a perspective view onto a base side that faces the cartridge lid 2. In order for the beverage substance to be securely stored in the chambers 4 until the beverage preparation, a sealing element 19, preferably in the form of a sealing film/foil, for example from a plastics material or a metal, is provided on the base side of the cartridge body 3. The sealing element 19 extends completely across the base side and covers all chambers 4 of the cartridge body 3. To this end, said sealing element 19 is fastened, for example welded or sealed, to a peripheral region, in particular to the end of the external wall 5 that faces the base side, in a materially integral manner to the cartridge body 3. In order to mutually separate the chambers 4 and to prevent that the beverage substance makes its way from one chamber 4 into another chamber 4, the sealing element 19 is furthermore fastened in a materially integral manner to those ends of the internal walls 7 that face the base side, for example welded or sealed to said ends.

The sealing element 19 in particular hermetically closes the chambers, i.e. inter alia in a fluid-tight and air-tight manner. The chambers here serve as a reservoir for a preferably liquid beverage substance. The person skilled in the art understands that instead of a beverage substance there may also be an in particular liquid foodstuff substance such as, for example, baby food, pulp, soup, or medicinal products such as high-calorie nutrition. It is vital that the (beverage) substance is provided to be mixed with a liquid, in particular water.

Figure 2:
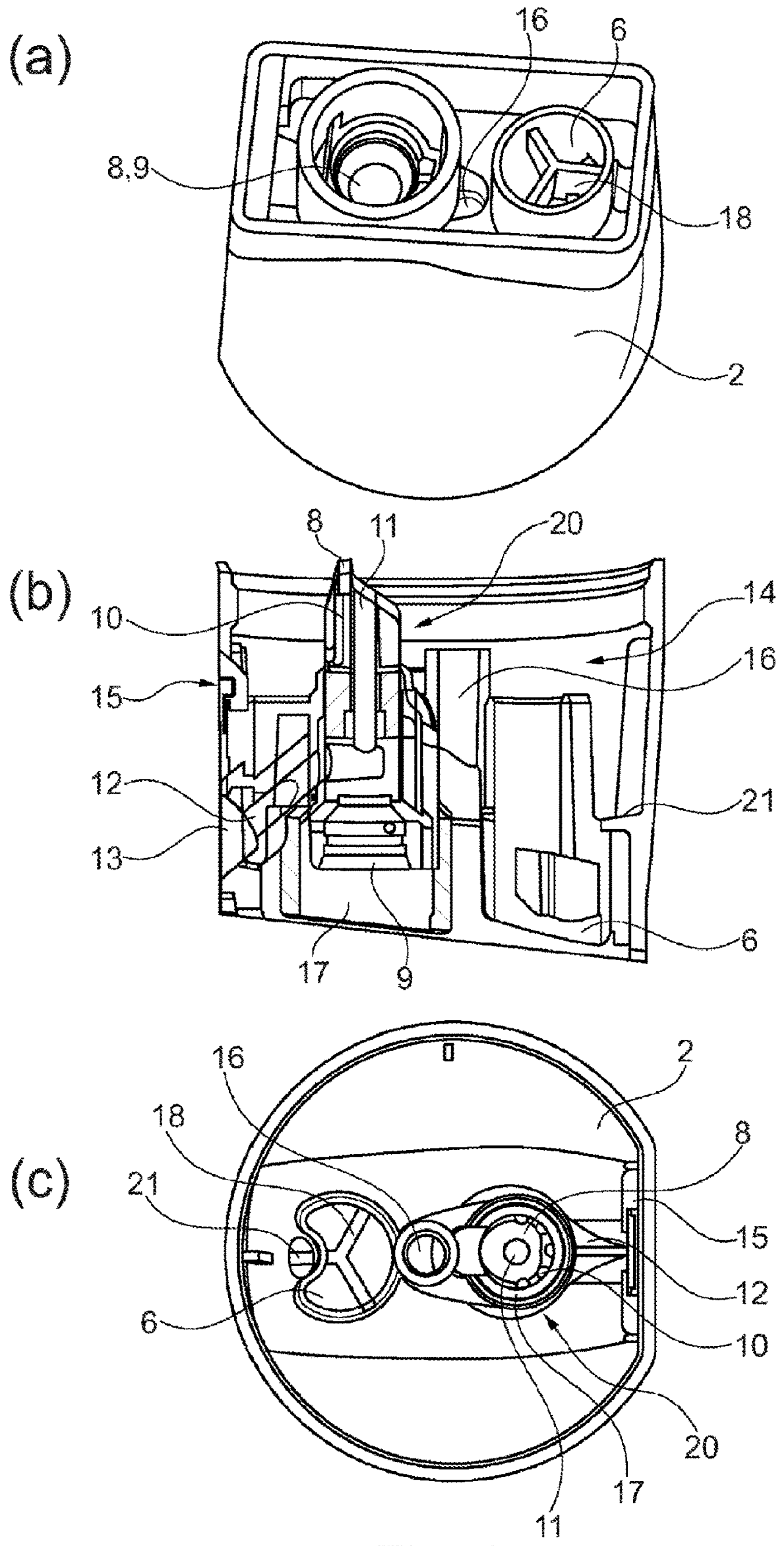
FIG. 2 (*a*)-(*c*) shows a cartridge lid cartridge according to an exemplary embodiment of the present invention, as seen from different angles.

Shown in FIG. 2 (*a*) is a perspective view of the cartridge lid 2 of a cartridge according to a preferred embodiment of the present invention.

The shaping of the cartridge lid 2, which here is merely by way of example, can be seen in particular here. Said cartridge lid 2 on the upper end thereof, which corresponds to the lower end according to the illustrations in FIGS. 1 (*a*) and 2 (*b*), has a wall-type, rectangular peripheral region within which are disposed the beverage outlet 6, a gas outlet 16, and an actuator receptacle 9 on a perforation needle 8. The cartridge lid 2 is preferably made from a plastics material.

With the exception of this region, the cartridge lid 2 here substantially has a dome shape, i.e. at the end thereof that lies opposite the opening is fundamentally configured so as to be rounded.

Furthermore illustrated in FIG. 2 (*a*) in the beverage outlet 6 is a jet-forming element 18 which here is configured in a ribbed, cruciform manner. The length of the beverage outlet 6, the cross section thereof, and the jet-forming element 15, conjointly serve for forming and/or orienting the exiting beverage jet.

A schematic cross section of a cartridge lid 2 of a cartridge 1 according to an exemplary embodiment of the present invention is illustrated in FIG. 2 (*b*).

The cartridge lid 2 is open toward the cartridge body 3, in particular toward the sealing means 19. The cartridge lid 2 at the opposite end has at least two openings. The one opening is the beverage outlet 6 by way of which the finished mixed beverage can exit and is transferred preferably directly into a beverage container such as a cup, a tumbler or a glass. The beverage outlet 6 is preferably configured in the manner of a duct, i.e. in a longitudinal extent comprises lateral walls. The length of the beverage outlet 6 here is in particular chosen in such a manner that a directed and homogeneous beverage jet is generated. The beverage outlet to this end particularly preferably also comprises a jet-forming element 18, for example a cross, which is disposed in the lower region and is configured to shape the jet in the desired manner.

A fluid infeed 15 which here is configured as a hole, in particular with a conical rim, is provided in a lateral wall of the cartridge lid 2. In the beverage-preparing machine this fluid infeed 15 interacts with a coupling element (not illustrated) by way of which a liquid, in particular chilled and/or carbonized water, is introduced into the cartridge lid 2 by way of the fluid infeed 15.

The free volume of the cartridge lid 2 here serves as a mixing chamber 14 in which the beverage substance is mixed with the inflowing liquid, thus forming the desired beverage before the latter exits through the beverage outlet 6.

As can be derived from the image, an upper opening of the beverage outlet 6 lies above a lower region of the mixing chamber 15 so that a sufficient length for forming the jet is achieved. So that the beverage generated in the mixing chamber 14 can nevertheless be totally directed out of the cartridge receptacle 1, and subsequent dripping when retrieving the cartridge system from the beverage-preparing machine and a residual dead volume, which cannot be utilized, can thus in particular be avoided, the cartridge receptacle 1 furthermore has a residue outlet 21 which is provided in particular at the lowest point of the mixing chamber (in the orientation as is present in the arrangement assembled in the beverage-preparing machine). The residue outlet 21 is particularly preferably provided so as to be adjacent to the beverage outlet 6 and/or is at least partially part of the beverage outlet 6. Here, for example, the beverage outlet 6 is provided in such a manner that the latter has a substantially circular cross section, whereby a small region of the cross section in a region of the circumference is configured as a residue outlet 21, however. In particular, the upper entry face of the residue outlet 21 is disposed lower than the upper entry face of the beverage outlet 6. It is consequently also presently the case that the length and the cross-sectional area of the residue outlet 21 are significantly smaller than the length and the cross-sectional area of the beverage outlet 6 because the residue outlet 21 is provided only for discharging a comparatively minor residual volume.

In order for the beverage substance to be transferred from the chamber 4 into the mixing chamber 14, the cartridge lid 2 has a cartridge unloading installation 20. The cartridge lid 2 below the fluid infeed 15 has a compressed air connector 13 which here likewise has a conical rim so as to interact with a compressed air infeed of the beverage-preparing machine so that compressed air can be introduced into the cartridge lid 2. A coupling element on the machine preferably comprises a compressed air line as well as a liquid line so that the coupling element is able to be coupled, in particular simultaneously, to both openings, i.e. the fluid infeed 15 and the compressed air connector 13. The compressed air from the compressed air connector 13 is directed in the direction of a mandrel guide 17. The latter here is configured as an opening which receives a perforation needle 8 in a form-fitting manner such that the latter is longitudinally displaceable between a retracted position and a deployed position. The mandrel guide 17 and the perforation needle 8 here are part of the cartridge unloading installation 20.

The perforation needle 8 is provided in such a manner that the latter interacts with an actuator element (not illustrated) of the beverage-preparing machine so that the perforation needle 8 is able to be transferred from the retracted position thereof to the deployed position. The perforation needle 8 in the deployed position perforates the sealing element 19 so that the beverage substance can flow through the sealing film/foil 19 into the mixing chamber 14, in particular by way of at least one transfer duct 10 in the form of a groove-shaped duct which is disposed on the external circumference of the perforation needle 8. Because a vacuum would or could be created in the chamber 4 when transferring the beverage substance out of the latter, the perforation needle 8 has an internal tubular compressed air duct 11 which opens into the tip of the perforation needle 8, wherein the perforation needle 8 and in particular the compressed air line 12 are configured in such a manner that the compressed air duct 11 is fluidically connected to the compressed air connector 13 only in the deployed position. It is ensured as a result that compressed air is not inadvertently introduced into the mixing chamber 14. The compressed air is introduced into the chamber 4 during the preparation of the beverage and in said chamber 4 replaces the volume that has become vacant by the outflow of the beverage substance into the mixing chamber 14, and forces out the beverage substance.

It is conceivable that the beverage-preparing machine controls the compressed air infeed in such a manner that, toward the end of the beverage preparation, a residual volume of the beverage substance, of the liquid and/or of the beverage is forced out of the cartridge 1 by way of the residue outlet 21.

Nevertheless, a certain volume of gas, in particular carbon dioxide, is typically released in the mixing chamber. This gas could escape into the environment by way of the beverage outlet 6, for example, and in the process however disturb the beverage jet. For example, an intermittent jet, or splashes or bubbles, may occur. This is not desirable. Therefore, the cartridge lid 2 has a gas outlet 16 which is in particular configured so as to be separate from the beverage outlet 6. Separate here means in particular that liquid and/or gas downstream of the mixing chamber 14 cannot make its way from the beverage outlet 6 into the gas outlet 16 and vice versa. There are thus no holes or fluidic connections between the two outlets which are preferably configured in the manner of ducts. It is thus ensured in turn that no liquid, thus neither the introduced liquid, nor the beverage substance or the finished beverage, exits by way of the gas outlet 16, but the beverage is primarily discharged by way of the beverage outlet 6 and secondarily by way of the smaller residue outlet 21, if an upper entry face of the gas outlet 16 is disposed higher than the upper entry face of the beverage outlet 6, as is depicted here.

The gas outlet 16 here is provided so as to be substantially centric in the cartridge receptacle 1 but may also be disposed in a peripheral region, for example. The arrangement shown here is however advantageous as it is desirable in the first place that, in the context of complete mixing, the liquid and the beverage substance travel an ideally long path between the fluid infeed 15 and the beverage outlet 6, and the centric region between the mandrel guide 17 and the beverage outlet 6 is thus advantageously available.

The perforation needle preferably has a tip and an obliquely disposed face which facilitate the perforation of the sealing element 19. The compressed air duct 10 preferably opens out in the aforementioned face and in particular centrically in the perforation needle 8.

The perforation needle 8 on the lower end thereof has an actuator receptacle 9, a region which here is embodied as a depression, in which the actuator element of the beverage-preparing machine engages in order to transfer the perforation needle 8 from the retracted position to the deployed position. This region is preferably configured so as to at least in portions taper toward the top, thus in the direction of the tip of the perforation needle 8, so as to enable simple centering of the actuator element, as a result of which tilting of the perforation needle 8 in the mandrel guide 17 and any potential resultant damage to the cartridge 1 and/or the beverage-preparing machine is avoided.

The lower end region of the cartridge lid 2 is presently provided so as to be oblique, but this is primarily an esthetic decision; for example, a substantially horizontally disposed end region, which is oriented so as to be in particular parallel to the opening plane defined by the connecting region and in particular the upper encircling edge, would also be possible.

The gas outlet 16 and the beverage outlet 6 here have a substantially circular cross section, with the exception of a small region which in the case of the beverage outlet 6 is occupied by the residue outlet 21. The person skilled in the art however understands that other cross sections, for example oval or polygonal cross sections, are also possible in principle.

FIG. 2 (*c*) now shows a view of the cartridge lid 2 from the direction of the sealing element 19 of the cartridge body 3. This embodiment corresponds substantially to the embodiments already explained above so that the explanations pertaining to the latter are also relevant here. It can be seen here in particular that the cartridge lid 2 has a substantially circular cross section with a flattening in the region of the fluid infeed 15 and the compressed air connector 13, so as to enable easier coupling to the beverage-preparing machine.

The mandrel guide 17, the gas outlet 16, the beverage outlet 6 and/or the residue outlet 21 are preferably integrally formed.

The groove-shaped transfer ducts 10 and the compressed air duct 11 of the perforation needle 8 of the cartridge emptying unit 20 can be readily seen here.

It can finally be seen from the illustration in FIG. 2 (*c*) that in particular the residue outlet 21, the beverage outlet 6, the gas outlet 16, the mandrel guide 17 and the fluid infeed 15 as well as the compressed air connector 13 lie substantially on an imaginary axis which runs from the left to the right in the picture, and that the mixing chamber 14 is largely provided on both sides of this axis.

LIST OF REFERENCE SIGNS

1 Cartridge
2 Cartridge lid
3 Cartridge body
4, 4.1 Chamber
4.2 Further chamber
5 External wall
6 Beverage outlet
7 Internal wall
8 Perforation needle
9 Actuator receptacle
10 Transfer duct
11 Compressed air duct
12 Compressed air line
13 Compressed air connector
14 Mixing chamber
15 Fluid infeed
16 Gas outlet
17 Mandrel guide
18 Jet-forming element
19 Sealing element
20 Cartridge emptying unit
L Longitudinal axis

The invention claimed is:

1. A cartridge for inserting into a beverage-preparing machine, the cartridge comprising:
   a) a cartridge body having a plurality of chambers filled with a beverage substance, and
   b) a cartridge lid connected to the cartridge body, the cartridge lid comprising:
      i. a cartridge emptying unit;
      ii. a mixing chamber; and
      iii. a fluid infeed that opens into the mixing chamber, wherein the cartridge emptying unit is provided for transferring the beverage substance from one of the chambers into the mixing chamber;

wherein the mixing chamber is provided for producing a beverage by mixing the beverage substance transferred from the one chamber into the mixing chamber with a liquid fed into the mixing chamber by the fluid infeed; and wherein the cartridge body and the cartridge lid are configured so as to be rotatable relative to one another about a longitudinal axis of the cartridge body.

2. The cartridge as claimed in claim 1, wherein the cartridge emptying unit is configured in such a manner that the latter transfers the beverage substance from exactly one chamber into the mixing chamber, wherein this chamber is selectable by a relative rotating movement of the cartridge body in relation to the cartridge lid.

3. The cartridge as claimed in claim 1, wherein the cartridge body has a barrel-shaped external wall, and the plurality of chambers are mutually separated by internal walls running in a star-shaped manner from the longitudinal axis of the cartridge body radially outward to the external wall.

4. The cartridge as claimed in claim 1, wherein a base side of the cartridge body that faces the cartridge lid is closed by a sealing element, wherein the sealing element is a sealing film/foil which is fastened in a materially integral manner to a peripheral region or a flange of the cartridge body.

5. The cartridge as claimed in claim 4, wherein the sealing element extends across a plurality of chambers and is connected in a materially integral manner to peripheral regions of internal walls.

6. The cartridge as claimed in claim 1, wherein the cartridge emptying unit has an opening means for opening a sealing element in a region of a chamber.

7. The cartridge as claimed in claim 6, wherein the opening means comprises a perforation needle which is displaceable between a retracted position in which the perforation needle is spaced apart from the sealing element, and a deployed position in which the perforation needle pierces the sealing element.

8. The cartridge as claimed in claim 7, wherein the perforation needle has a compressed air duct for directing compressed air into the respective chamber in the deployed position.

9. The cartridge as claimed in claim 7, wherein the perforation needle has a transfer duct for transferring the beverage substance from the respective chamber into the mixing chamber in the deployed position.

10. The cartridge as claimed in claim 8, wherein the compressed air duct is configured as a unilaterally open groove on an external face of the perforation needle or as a tubular line within the perforation needle.

11. The cartridge as claimed in claim 6, wherein a ratchet mechanism that defines latching positions in which the opening means is in each case disposed centrally below a chamber is configured between the cartridge body and the cartridge lid.

12. The cartridge as claimed in claim 1, wherein a blocking mechanism, which is adjustable between a blocking position in which a relative rotating movement of the cartridge body in relation to the cartridge lid is blocked, and a releasing position in which the relative rotating movement of the cartridge body in relation to the cartridge lid is released, is configured between the cartridge body and the cartridge lid.

13. A method for operating a cartridge as claimed in claim 1, comprising the following method steps:

a. rotating the cartridge body relative to the cartridge lid until the cartridge emptying unit is co-aligned with a desired chamber in a first method step;

b. opening the chamber by means of the cartridge emptying unit in a second method step;

c. transferring the beverage substance disposed in the chamber into the mixing chamber by means of the cartridge emptying unit in a third method step; and d. feeding a liquid into the mixing chamber by means of the fluid infeed in the third method step.

14. The method as claimed in claim 13, wherein, in a fourth method step, the cartridge body is again rotated relative to the cartridge lid until the cartridge emptying unit is co-aligned with a further chamber, and repeating the second and the third method step with the further chamber.

15. The method as claimed in claim 13, wherein, in the second method step, a sealing element closing the chamber is perforated in that a perforation needle is displaced from a retracted position into a deployed position.

16. The method as claimed in claim 15, wherein, in the third method step, compressed air is directed through a compressed air duct of the perforation needle into the chamber, and the beverage substance is directed through a transfer duct of the perforation needle from the chamber into the mixing chamber.

17. The method as claimed in claim 14, wherein in an intermediate step, which is carried out after the third method step and before the fourth method step, a perforation tip is displaced from a deployed position into a retracted position.

18. The cartridge as claimed in claim 5, wherein the sealing element extends completely across the base side of the cartridge body.

19. The cartridge as claimed in claim 9, wherein the transfer duct is configured as a unilaterally open groove on an external face of the perforation needle or as a tubular line within the perforation needle.

* * * * *